J. D. ELLISON.
AUTOMATIC VEHICLE BRAKE.
APPLICATION FILED APR. 26, 1909.
1,003,174.
Patented Sept. 12, 1911.
3 SHEETS—SHEET 3.
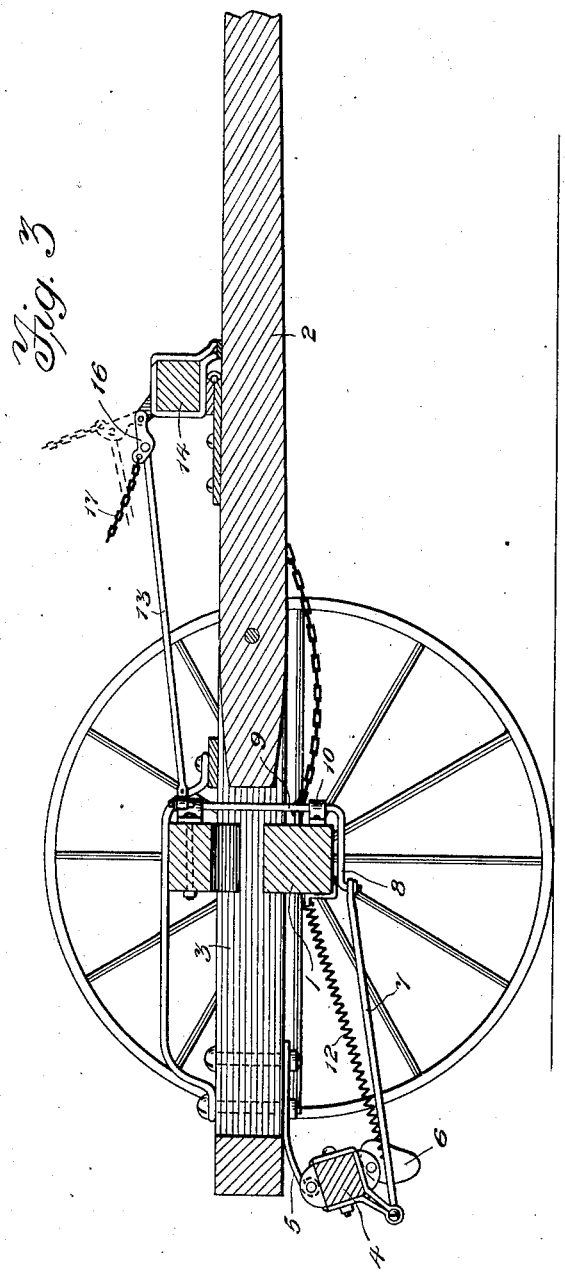
Witnesses
Inventor
John D. Ellison,
By Edson Bros,
Attorneys

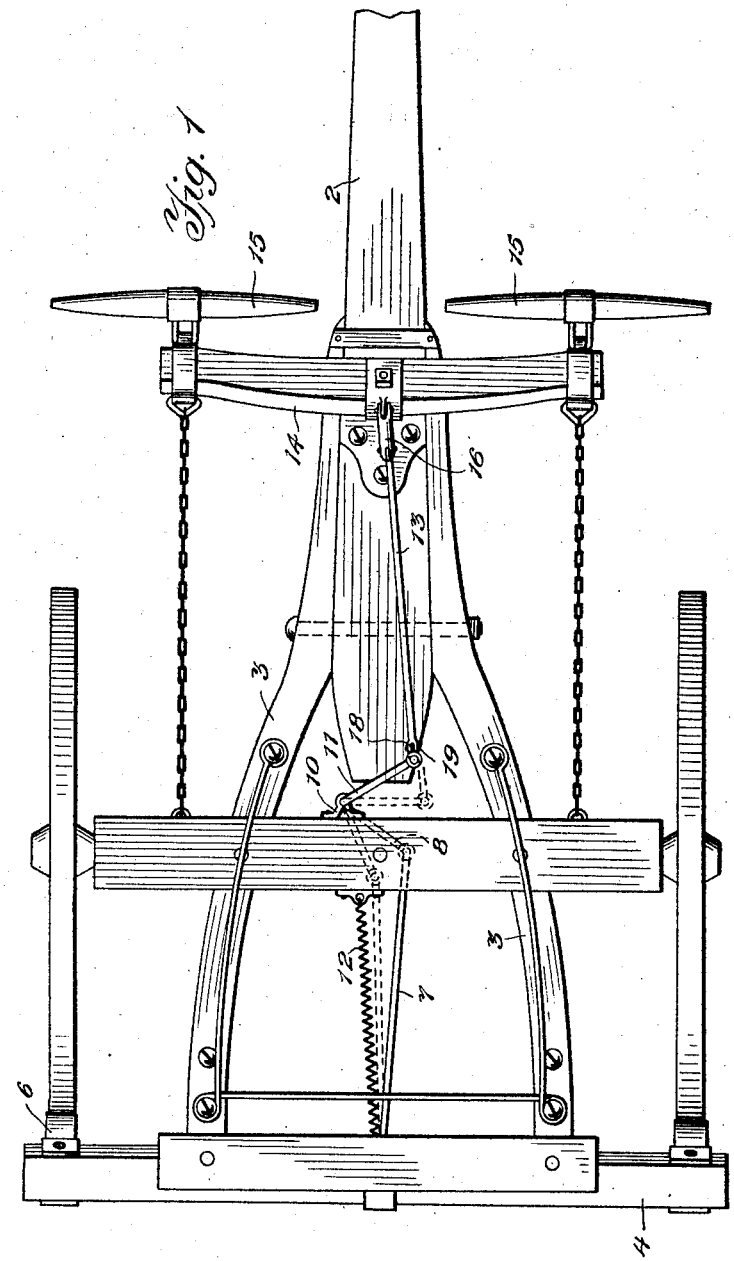

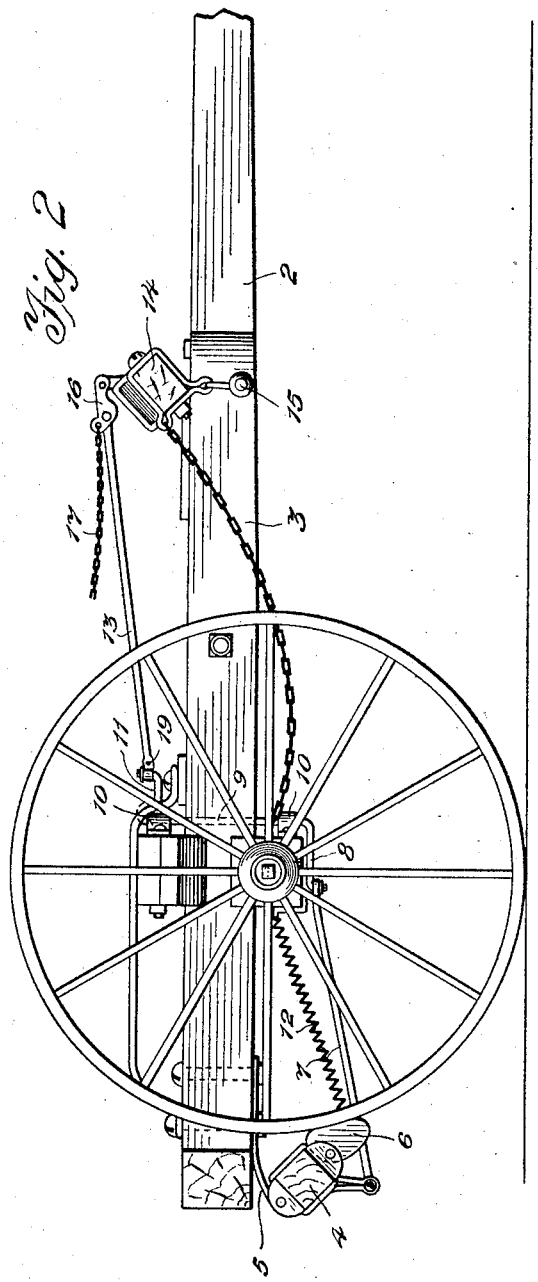

UNITED STATES PATENT OFFICE.

JOHN D. ELLISON, OF RIVES, TENNESSEE, ASSIGNOR OF ONE-HALF TO EVERETT B. CHESTER, OF BROWNSVILLE, TENNESSEE.

AUTOMATIC VEHICLE-BRAKE.

1,003,174. Specification of Letters Patent. Patented Sept. 12, 1911.

Application filed April 26, 1909. Serial No. 492,174.

*To all whom it may concern:*

Be it known that I, JOHN D. ELLISON, a citizen of the United States, residing at Rives, in the county of Obion and State of Tennessee, have invented certain new and useful Improvements in Automatic Vehicle-Brakes; and I do hereby declare the following to be a full, clear, and exact description of the invention, such as will enable others skilled in the art to which it appertains to make and use the same.

My invention relates to automatic vehicle brakes especially adapted for use on wagons.

It has for its object to provide a brake which is normally held in contact with the wheels of the vehicle, but which is automatically released when the vehicle is propelled by horses in the usual manner.

Further objects are to provide means for applying the brake when desired while the vehicle is in motion, as when a runaway occurs, and to do away with the jar usually caused by applying the brakes.

A still further object is to provide a brake shoe which when opposed by turning the wheels forward will increase its clamping action upon the wheels, but which will not interfere with said wheels being turned backward as when backing the vehicle.

The invention consists in the features of construction and combinations of parts hereinafter described and specified in the claims.

In the accompanying drawings illustrating the preferred embodiment of my invention: Figure 1 is a plan view of the front truck of a vehicle showing the brake applied in solid lines and the positions of the parts when the brake is released in dotted lines. Fig. 2 is a side view, and Fig. 3 is a central vertical section showing the positions of the parts when the brake is released, as when the vehicle is being drawn by horses, in solid lines and the positions of the parts when the brake is applied by hand in dotted lines.

Referring more particularly to the drawings, 1 designates the axle, 2 the tongue and 3 the hounds. The brake bar 4 is hinged to bowed plate springs 5 secured to the hounds. Brake shoes 6 are pivotally mounted on the ends of the brake bar eccentrically so that their clamping action is increased when they are opposed by attempting to move the vehicle when the brake is applied. Said brake bar is pivoted at one edge while its diametrically opposite edge is connected to a rod 7 also fastened to the lower crank 8 of a crank shaft 9. Said crank shaft is mounted vertically in brackets 10 secured to the axle and has another crank 11 arranged above said axle. A spring 12 arranged between the connecting rod 7 and the axle normally holds the brake bar in set position.

The upper crank 11 is connected by means of a rod 13 to the cross tree 14 which is hinged to the tongue in such a manner as to be normally arranged in a pitched-forward position when the brake is applied. The swingletrees 15 are secured to the lower edges of the cross tree whereby the tightening of the traces attached to said swingletrees will turn the cross tree to an upright position. The connecting rod 13 is equipped with a trigger 16 to which is connected a hand chain 17 extending into reach of the driver. Said trigger is normally arranged in alinement with the rod 13 but it may be raised or thrown by means of the chain 17 so as to set the brake when the cross tree is in upright position, as may be desirable in case of a runaway. This operation of the trigger is illustrated in dotted lines in Fig. 3.

The connection of the rod 13 with the upper crank is adjustable by means of a slot 18 in said rod, which is engaged by the end of the crank, and of a pin 19 adapted to retain the end of said crank in either extremity of said slot. This adjustment governs the extent to which the cross tree must be turned in order to release the brake and also, of course, determines whether the slack upon the traces shall be greater or less in order to apply the brake.

It will be noted that the brake shoes 6 engage the wheels below the horizontal line of the hinge that connects the brake bar to the springs 5. The result is that when the wheels are turned forward, the brake shoes increase their clamping action. However, when the wheels are turned backward they are only required to overcome the slight friction of the shoe caused by the spring 12 which need be only strong enough to draw the shoes to the wheels. It will thus be seen that a vehicle equipped with my brake may be backed at will but that as soon as forward movement is attempted the brakes are automatically applied except when the brakes are released by the pulling of the horses on the traces.

The bowed springs 5 yieldingly hold the brake beam with its shoes in clamping position so that said shoes and beam are permitted to give or yield in a line tangential to the wheels at the point of contact of said shoes therewith. This action cushions the brake so that when it is applied, the usual jolt occasioned thereby is not transmitted to the vehicle. It also relieves the shoes from considerable strain and makes them wear longer. The action of the bowed springs furthermore increases the power of the brake as the latter is clamped against the wheel by the frictional contact between the two last mentioned parts.

I claim:—

1. In a vehicle, the combination, with the hounds, an axle rigidly secured thereto, and a wheel mounted on said axle, of a brake, a resilient support for said brake pivotally connected thereto and secured to the hounds, means for normally holding said brake in contact with the wheel, said brake engaging the wheel at a point out of the radial line of the wheel which passes through the pivotal connection between said brake and resilient support, the latter being adapted to yield away from the wheel and to increase the pressure of the brake as it is clamped against the wheel by the frictional contact between the two last named parts, and means to release said brake from the wheel.

2. In a vehicle, the combination, with the hounds, an axle rigidly secured thereto, and a wheel mounted on said axle, of a brake, a resilient support for said brake pivotally connected thereto and secured to the hounds, means for normally holding said brake in contact with the wheel, said brake engaging the wheel at a point out of the radial line of the wheel which passes through the pivotal connection between said brake and resilient support, the latter being adapted to yield away from the wheel and to increase the pressure of the brake as it is clamped against the wheel by the frictional contact between the two last named parts, and means to automatically release said brake from the wheel when the vehicle is drawn forward.

3. In a vehicle, the combination, with the hounds, an axle rigidly secured thereto, and a wheel mounted on said axle, of a brake, a bowed spring pivotally connected thereto and secured to the hounds, means for normally holding said brake in contact with the wheel, said brake engaging the wheel at a point out of the radial line of the wheel which passes through the pivotal connection between said brake and bowed spring, the latter being adapted to yield away from the wheel and to increase the pressure of the brake as it is clamped against the wheel by the frictional contact between the two last named parts, and means to release said brake from the wheel.

4. In a vehicle, the combination, with the hounds, an axle rigidly secured thereto, and a wheel mounted on said axle, of a brake, a bowed spring pivotally connected thereto and secured to the hounds, means for normally holding said brake in contact with the wheel, said brake engaging the wheel at a point out of the radial line of the wheel which passes through the pivotal connection between said brake and bowed spring, the latter being adapted to yield away from the wheel and to increase the pressure of the brake as it is clamped against the wheel by the frictional contact between the two last named parts, and means to automatically release said brake from the wheel when the vehicle is drawn forward.

5. The combination, with a wheel of a vehicle, of a brake beam pivotally supported from said vehicle, a brake shoe eccentrically pivoted to said beam for the purpose specified, means to normally hold the brake beam in position with its shoe engaging the wheel, means to hold said beam and shoe in clamping position which allows them to yield away from the direction of rotation of the wheel in a line tangential to said wheel at the point of contact of the brake therewith, and means to automatically release said brake from said wheel when the vehicle is drawn forward.

6. The combination, with opposite wheels of a vehicle, of a brake hinged to the vehicle, means normally holding said brake yieldingly in contact with said wheels, a tree also hinged to the vehicle and normally arranged in a pitched-forward position, means for connection with a source of locomotion arranged at the lower forward edge of said tree, and means of connecting said tree and brake whereby the latter is released from the wheels when the former is turned to an upright position as the vehicle is drawn forward.

7. The combination, with opposite wheels of a vehicle, of a brake hinged to the vehicle, means normally holding said brake yieldingly in contact with said wheels, a tree also hinged and normally arranged in a pitched-forward position, a crank shaft pivotally mounted on the vehicle, connecting rods from said crank shaft to said beam and tree, and means for connection with a source of locomotion arranged at the lower forward edge of said tree, all for the purposes specified.

8. The combination, with opposite wheels of a vehicle, of a brake hinged to the vehicle, means normally holding said brake yieldingly in contact with said wheels, a tree also hinged and normally arranged in a pitched-forward position, means for connection with a source of locomotion arranged at the lower forward edge of said tree, a crank shaft pivotally mounted on the vehicle, a connecting rod from said crank shaft to the brake, another connecting rod from said crank shaft to said tree, and a trigger device on the last mentioned rod adapted to be operated by hand for the purpose specified.

9. The combination, with opposite wheels of a vehicle, of a brake hinged to the vehicle, means normally holding said brake yieldingly in contact with said wheels, a tree also hinged to the vehicle and normally arranged in a pitched-forward position, means for connection with a source of locomotion arranged at the lower forward edge of said tree, means of connecting said tree and brake whereby the latter is released from the wheels when the former is turned to an upright position as the vehicle is drawn forward, and means for applying said brake when said tree is in an upright position.

10. The combination, with opposite wheels of a vehicle, of a brake hinged to the vehicle, means normally holding said brake yieldingly in contact with said wheels, a tree also hinged and normally arranged in a pitched-forward position, means for connection with a source of locomotion arranged at the lower forward edge of said tree, a crank shaft pivotally mounted on the vehicle, a connecting rod from said crank shaft to the brake, another connecting rod from said crank shaft to said tree, and means of adjustment between said last mentioned rod and the crank shaft for the purpose specified.

In testimony whereof, I affix my signature, in presence of two witnesses.

JOHN D. ELLISON.

Witnesses:
 COTHON BONNER,
 EDGAR E. SHORE.